United States Patent [19]

Hoy

[11] 4,421,202

[45] Dec. 20, 1983

[54] SOUND ATTENUATOR

[75] Inventor: Robert W. Hoy, Warsaw, Ind.

[73] Assignee: Peabody ABC Corporation, Warsaw, Ind.

[21] Appl. No.: 245,903

[22] Filed: Mar. 20, 1981

[51] Int. Cl.³ .............................................. F01N 1/10
[52] U.S. Cl. .................................... 181/252; 181/225; 181/243; 181/244; 138/130; 138/132; 138/149; 138/174; 138/DIG. 2
[58] Field of Search ............... 181/224, 225, 231, 227, 181/244–248, 252, 256, 258, 280, 282; 138/129, 130, 132, 149, 174, DIG. 2; 428/36, 377; 156/74

[56] References Cited

U.S. PATENT DOCUMENTS

| | | | |
|---|---|---|---|
| 2,703,109 | 3/1955 | Saville | 138/109 X |
| 2,809,145 | 10/1957 | McDermontt | 181/207 X |
| 3,093,160 | 6/1963 | Boggs | 138/140 |
| 3,104,732 | 9/1963 | Ludlow et al. | 181/227 |
| 3,175,640 | 3/1965 | Matsui | 181/252 |
| 3,350,030 | 10/1967 | Green | 242/118.32 |
| 3,399,092 | 8/1968 | Adams et al. | 156/74 |
| 3,540,547 | 11/1970 | Coward, Jr. | 181/225 |
| 3,563,338 | 2/1971 | Radar | 181/243 |
| 3,902,552 | 9/1975 | McLain | 138/156 X |
| 3,915,477 | 10/1975 | Timmons | 138/DIG. 2 X |
| 3,921,674 | 11/1975 | Logan et al. | 138/132 X |
| 3,924,632 | 12/1975 | Cook | 138/132 X |
| 3,955,643 | 5/1976 | Clark | 181/248 |
| 4,118,262 | 10/1978 | Abbott | 138/DIG. 2 X |
| 4,173,670 | 11/1979 | VanAuken | 138/DIG. 2 X |
| 4,230,293 | 10/1980 | Hamm et al. | 138/144 X |
| 4,369,473 | 1/1982 | Minamisawa et al. | 428/36 X |

Primary Examiner—Benjamin R. Fuller
Attorney, Agent, or Firm—St. Onge, Steward, Johnston & Reens

[57] ABSTRACT

A sound attenuator comprising concentric inner and outer tubular members having sound absorbing material positioned therebetween. The inner tubular member comprises a lattice of reinforcing strand material coated with solidified resin wherein the strand material is formed in opposed generally helical patterns to provide the lattice. The attenuator is suitable for use in reducing noise produced by axial flow fans used in industrial environs such as mines and factories.

13 Claims, 4 Drawing Figures

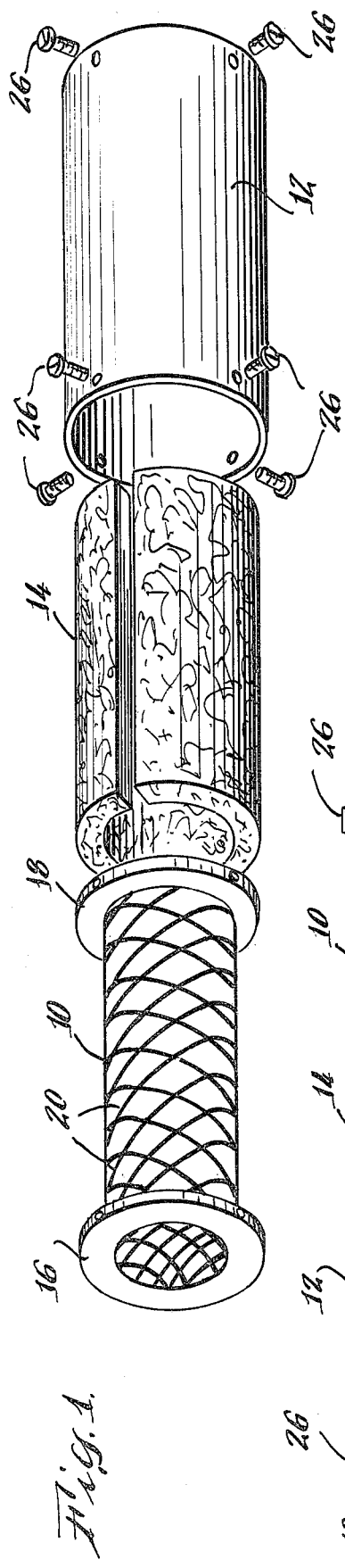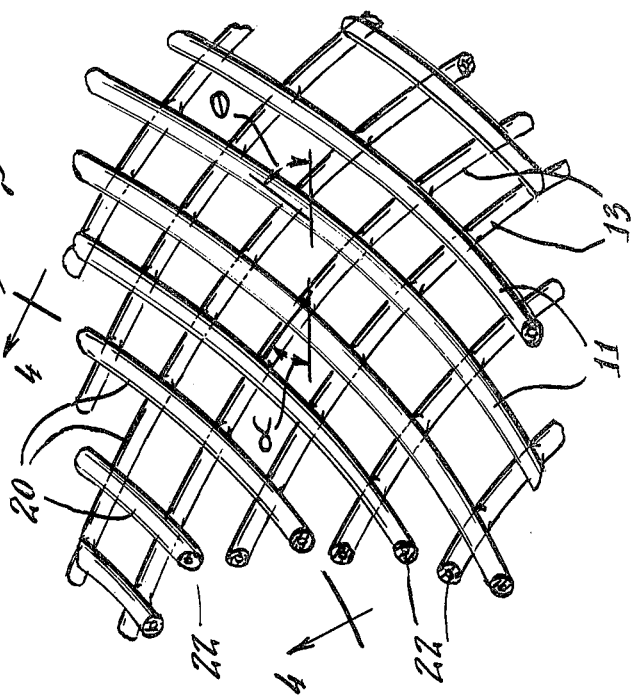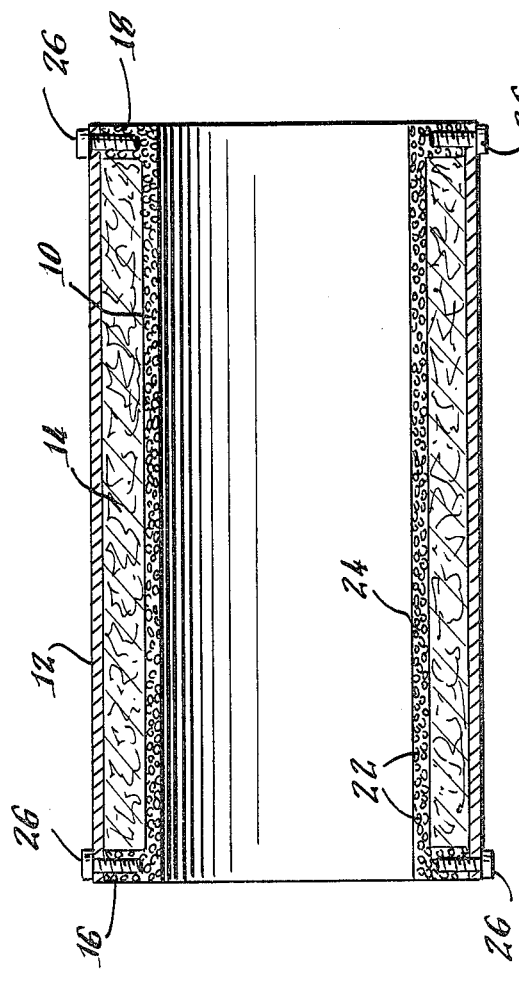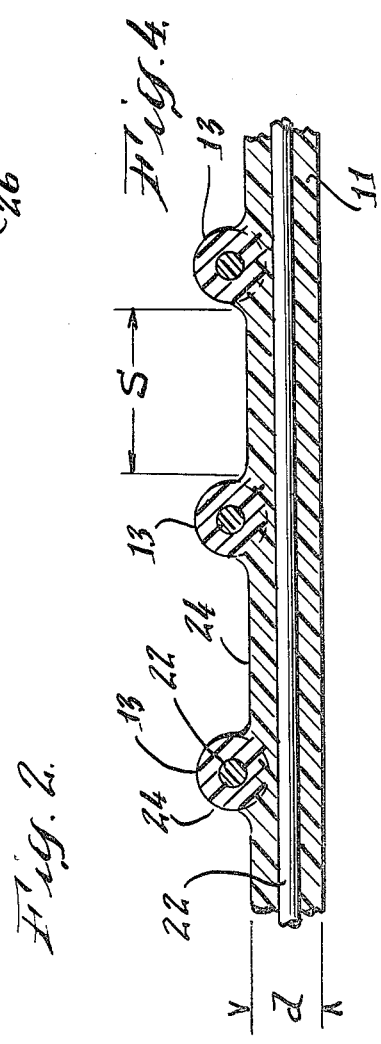

SOUND ATTENUATOR

BACKGROUND OF THE INVENTION

1. Field of the Invention

The present invention relates to sound attenuators used in ventilation, and, more particularly, the present invention relates to sound attenuators for positioning adjacent ventilation fans that produce noise and vibration in industrial areas such as mines or factories.

2. Description of the Prior Art

Sound attenuators are used to quiet objectionable high pitched sound and vibrations produced by ventilation fans. Sound attenuators are typically used with axial flow fans such as, for example, those used in underground mining and factories.

One type of conventional sound attenuator comprises concentric tubular inner and outer members having sound absorbing material positioned in a space therebetween. The tubular inner member is made of perforated metal and the tubular outer member is made of solid metal. The tubular members are held in concentric relation by flanges welded between the tubular members at either ends thereof. Although these attenuators provide adequate sound attenuation, they have several drawbacks. They are bulky, heavy, and easily dented and damaged. Since the attenuators are primarily made from metal, they corrode. If the sound absorbing material, which is placed in the space between the concentric tubular members, becomes wet during use, the attenuator is rendered substantially useless and must be replaced.

SUMMARY OF THE INVENTION

A sound attenuator in accordance with the present invention comprises a tubular inner member comprising a lattice of reinforcing strand material coated with solidified resin and a tubular outer member having a diameter greater than the diameter of the tubular inner member and positioned in concentric relation to the tubular inner member to provide a space therebetween. A sound absorbing material, such as fiberglass batting, is positioned in the space between the two tubular members.

In accordance with one aspect of the invention, the lattice of the tubular inner member is formed by winding the reinforcing strand material, which has been coated with uncured resin, in a first helical pattern wherein each strand or group of strands is spaced apart from the next strand or group of strands. The reinforcing strand material is then wound in a helical pattern opposed to the first helical pattern to form a lattice comprising reinforcing strand material coated with uncured resin. The resin is then allowed to cure to form a tubular inner member comprising a lattice of reinforcing strand material coated with solidified resin.

In accordance with another aspect of the invention, spaced apart and outwardly extending flanges are formed on the ends of the tubular inner member. Preferably, the flanges are formed integrally with the body of the tubular inner member and, more specifically, are formed by building up layers of reinforcing strand material coated with uncured resin and then allowing the resin to cure to form flanges integral with the inner member. The integral flanges serve to retain the sound absorbing material which is positioned therebetween and serve to retain the tubular inner member in concentric relation to the tubular outer member.

A sound attenuator in accordance with the present invention has several important advantages. The sound attenuator is lighter in weight than comparable sheet metal attenuators, has vastly improved dent and abuse resistance, and is highly corrosion resistant. Moreover, the inner member may be removed from the outer member for access and replacement of the sound absorbing material positioned therebetween. Furthermore, because the method of fabrication of the tubular inner member is relatively simple, the sound attenuator in accordance with the present invention is relatively inexpensive. These advantages and others will be described and shown in detail in the following brief description of the drawings and the detailed description of the invention.

BRIEF DESCRIPTION OF THE DRAWINGS

FIG. 1 is a perspective exploded view of a disassembled sound attenuator in accordance with the present invention;

FIG. 2 is a sectional view of a sound attenuator in accordance with the present invention taken along a plane passing through the central longitudinal axis of the attenuator;

FIG. 3 is an expanded perspective view of the lattice of the tubular inner member shown in FIGS. 1 and 2; and FIG. 4 is a sectional view along the plane 4—4 of FIG. 3.

DESCRIPTION OF THE PREFERRED EMBODIMENT

Referring to FIGS. 1 and 2, the sound attenuator includes a tubular inner member 10, a tubular outer member 12 and a sound absorbing material 14 for positioning therebetween. Tubular member 10 includes spaced apart and outwardly extending flanges 16 and 18 on the ends thereof. The flanges 16 and 18 provide a means for retaining tubular members 10 and 12 in concentric relation and also define a space therebetween in which the sound absorbing material 14 is placed.

Tubular inner member 10 will now be described in detail with reference to FIGS. 1-4. The tubular inner member 10 comprises a lattice 20 of reinforcing strand material 22 coated with a solidified resin 24. As shown in FIGS. 3 and 4, which are expanded views of the lattice, the strand material is formed in opposed generally helical patterns wherein one helical pattern has a helix angle $\theta$ between about 45 and 70 degrees and the other helix pattern has a helix angle $\alpha$ between about 45 and 70 degrees in a direction opposite to the direction of the angle of the first helix pattern. In the preferred embodiment of the invention, the helix angle of both helix patterns is substantially equal and is approximately 67 degrees.

The reinforcing strand material is preferably made of fiberglass rovings, which are bundles of individual glass filaments twisted to form a strand. It should be understood however, that fiberglass strands are given by way of example and that other reinforcing strand materials may be used, such as, for example, carbon, polyesters, aramids and graphite.

The reinforcing strand material is coated with an uncured thermosetting resin. The particular thermosetting resin used in connection with the invention will be determined on the basis of several factors including corrosion resistance in the intended environment, strength, cost and ease of use during forming. One example of thermosetting resin which may be used is an unsaturated polyester resin with a metal salt initiator and methyl ethyl keytone peroxide catalyst such as a resin system sold by Koppers Incorporated under the trade designation Resin 7000 series. Examples of other thermosetting resin systems are furan resins such as HETRON 800, epoxy resins such as ARNOX sold by General Electric Company, and vinylester resins such as HETRON 901.

In order to fabricate the lattice of the tubular inner member 10, the fiberglass rovings coated with uncured resin are wound on a cylindrical mandrel in a helical pattern wherein each roving is spaced apart. Referring to FIGS. 3 and 4, when the first helical pattern 11 is completed in one direction, and before the resin cures, a second helical pattern 13 is wound in an opposing direction. Thereafter, the resin is allowed to cure to form the lattice shown in FIGS. 3 and 4. Referring to FIG. 4, an intimate bond between the strands of one helical pattern 11 and the strands of the other helical pattern 13 is provided by the thermosetting resin that coats the fiberglass rovings.

Referring to FIGS. 1 and 2, flanges 16 and 18 are preferably integrally formed with the lattice 20. While the lattice is still on the forming mandrel, molds are placed on the ends of the tubular inner member. Fiberglass rovings coated with uncured resin are wound in a circular pattern around the tubular member and built up to form the flanges. Upon forming of the flanges, the entire structure is allowed to cure to form a single piece tubular inner member.

It is preferred that the inner member have an open surface area, that is the sum of the areas of the openings in the lattice, which is between about 15% and about 40% of the total surface area of the inner member. The particular percentage of open surface area may be selected depening on the characteristics of the noise to be attenuated. For high pitched noises, a lower percentage of open surface area is desirable. The percentage of open surface area is determined by the diameter of the coated rovings and the spacing therebetween. As shown in FIG. 4, the diameter, d, of the coated rovings is preferably between about 0.1 and about 0.2 inches and the spacing, s, therebetween and preferably between about ⅛ and about ¼ inches. It should be understood that each lath of the lattice preferably comprises a single coated roving. However, each lath may also comprise groups of rovings joined lengthwise to each other by cured resin.

Referring to FIGS. 1 and 2, the sound absorbing material 14 used in a sound attenuator in accordance with the present invention may be selected from a number of sound absorbing materials. While the material shown in the drawings is a fiberglass batting formed in a cylindrical shape to snugly fit in the space between inner and outer tubular members 10 and 12, other types of sound absorbing material such as rockwool batting and plastic foams may also be used. The particular sound absorbing material used will, of course, depend upon the particular sound absorbing properties desired and the environment in which the sound attenuator is intended for use.

The tubular outer member is a cylindrical solid tube, preferably formed of fiberglass reinforced plastic. However, it should be understood that in environments wherein weight is not a factor and exterior corrosion resistance is not required, a metal tubular outer member may be used. As shown in FIGS. 1 and 2, the ends of tubular outer member 12 may be fastened to the periphery of flange 16 and 18 of tubular inner member 10 by a series of screw fasteners 26. In the even that sound absorbing material 14 becomes wet during use, screw fasteners 26 can be removed and the attenuator may be disassembled to allow replacement of the sound absorbing material.

It should be understood that an attenuator in accordance with the present invention is light weight, corrosion resistant and inexpensive to manufacture. Moreover, a sound attenuator in accordance with the present invention may be disassembled by removing fasteners 26 to allow removal and replacement of the sound absorbing material.

It should be understood that although a specific embodiment of the invention has been described herein in detail, such description is for purposes of illustration only and modifications may be made thereto by those skilled in the art within the scope of the invention.

What is claimed is:

1. A sound attenuator comprising:
   a tubular inner member having an interior and comprising a lattice of reinforcing strand material coated with solidified resin, said strand material being formed in two opposed generally helical patterns that intersect at a plurality of points, said strand material of one said helical pattern being intimately bonded by said solidified resin to said strand material of said other generally helical pattern at substantially each said point of intersection, said lattice having a plurality of open areas between said strand material;
   a tubular outer member having a diameter greater than the diameter of said tubular inner member;
   means for retaining said tubular members in concentric relationship to provide a space therebetween; and
   sound absorbing material positioned in said space, said sound absorbing material being in communication with said interior of said tubular inner member through said open areas to provide for sound attenuation.

2. A sound attenuator according to claim 1 wherein each of said helical patterns comprises spaced apart single strands.

3. A sound attenuator according to claim 2 wherein one of said helical patterns has a helix angle between about 45 and 70 degrees and said other helix pattern has a helix angle between about 45 and about 70 degrees and extends in an opposing direction.

4. A sound attenuator according to claim 3 wherein said strand material comprises fiberglass rovings.

5. A sound attenuator according to claim 1 wherein said means for retaining comprises spaced apart and outwardly extending flanges on the ends of said tubular inner member.

6. A sound attenuator according to claim 5 and including means for removably fastening said tubular outer member to the periphery of said flanges to thereby permit said attenuator to be disassembled and said sound absorbing material replaced.

7. A sound attenuator according to claim 5 or 6 wherein said flanges are integrally formed with said lattice.

8. A sound attenuator according to claim 1 wherein said resin is a thermosetting resin.

9. A sound attenuator for reducing noise produced by axial flow fans in industrial applications comprising:
  a tubular inner member comprising a lattice of fiberglass rovings coated with solidified resin, said coated rovings being formed in two opposed generally helical patterns wherein one pattern has a helix angle between about 45 and about 70 degrees and another pattern has a helix angle between about 45 and about 70 degrees, said rovings intersecting at a plurality of points, said rovings of one said helical pattern being intimately bonded by said solidified resin to said rovings of said another helical pattern at substantially each said point;
  two spaced apart flanges each extending radially outwardly from an end of said inner member and terminating in a flange periphery, said flanges each comprising a multitude of windings of fiberglass rovings coated with solidified resin wound in a generally circular pattern about the inner member and built up to form each said flange, each said flange being integrally bonded to said inner member by said solidified resin;
  a tubular outer member having a diameter greater than the diameter of said inner member;
  means for fastening said outer member to said periphery of each flange to define a space bounded by said inner and outer members and said flanges; and
  sound absorbing material positioned in said space.

10. A sound attenuator according to claim 8 wherein said inner member has an open surface area being between about 15 and about 40 percent of the total surface area of the inner member.

11. A sound attenuator according to claim 9 wherein said coated fiberglass rovings have a diameter between about 0.1 and about 0.2 of an inch and wherein said rovings of said helical patterns are spaced apart between about ⅛ and about ¼ inches.

12. A sound attenuator according to claim 11 wherein said resin comprises a cured thermosetting unsaturated polyester resin cured with a metal salt initiator and a methyl ethyl keytone peroxide catalyst.

13. A sound attenuator according to claim 1 wherein said tubular inner member has a total surface area and wherein said open areas comprise between about 15 and about 40 percent of the total surface area.

* * * * *